(12) United States Patent
Tyrberg

(10) Patent No.: US 11,346,744 B2
(45) Date of Patent: May 31, 2022

(54) METHOD AND SYSTEM FOR FATIGUE-MONITORING OF A SUBMARINE CABLE IN OFF-SHORE OPERATIONS

(71) Applicant: NKT HV Cables AB, Lyckeby (SE)

(72) Inventor: Andreas Tyrberg, Lyckeby (SE)

(73) Assignee: NKT HV Cables AB, Lyckeby (SE)

( * ) Notice: Subject to any disclaimer, the term of this patent is extended or adjusted under 35 U.S.C. 154(b) by 113 days.

(21) Appl. No.: 16/758,574

(22) PCT Filed: Nov. 7, 2018

(86) PCT No.: PCT/EP2018/080522
§ 371 (c)(1),
(2) Date: Apr. 23, 2020

(87) PCT Pub. No.: WO2019/092053
PCT Pub. Date: May 16, 2019

(65) Prior Publication Data
US 2020/0348204 A1   Nov. 5, 2020

(30) Foreign Application Priority Data

Nov. 8, 2017   (EP) .................................. 17200664

(51) Int. Cl.
*G01M 5/00* (2006.01)
*H01B 7/14* (2006.01)

(52) U.S. Cl.
CPC ........ *G01M 5/0058* (2013.01); *G01M 5/0033* (2013.01); *H01B 7/14* (2013.01)

(58) Field of Classification Search
CPC ... G01N 2203/0069; G01N 2203/0073; G01N 2203/0075; G01L 5/101
See application file for complete search history.

(56) References Cited

U.S. PATENT DOCUMENTS 4,498,812 A * 2/1985 Lanfranconi ............ H02G 1/10
405/157
5,065,631 A * 11/1991 Ashpitel ............ G01M 5/0083
73/849

(Continued)

FOREIGN PATENT DOCUMENTS

EP     2902584 A2    8/2015
WO   2006102259 A2   9/2006

(Continued)

OTHER PUBLICATIONS

European Search Report; Summons to Oral Proceedings; Application No. 17 200 664.5; Issued: Jan. 14, 2021; 6 Pages.

(Continued)

*Primary Examiner* — Tran M. Tran
(74) *Attorney, Agent, or Firm* — Whitmyer IP Group LLC

(57) ABSTRACT

A method for fatigue-monitoring of a submarine cable during off-shore jointing or reparation includes: a) determining a plurality of curvature values concerning a curvature of the submarine cable at different points in time during the off-shore jointing or reparation, b) determining a plurality of strain ranges of the submarine cable based on the plurality of curvature values, and c) determining a fatigue damage of the submarine cable based on the plurality of strain ranges.

13 Claims, 2 Drawing Sheets

(56) References Cited

U.S. PATENT DOCUMENTS

| | | | | |
|---|---|---|---|---|
| 5,946,094 A * | 8/1999 | Sahlgren | ............... | E21B 47/022 356/477 |
| 6,854,327 B2 * | 2/2005 | Rambow | ............... | G01B 11/18 73/250 |
| 7,194,913 B2 * | 3/2007 | Morrison | ............. | E21B 17/015 73/800 |
| 7,277,162 B2 * | 10/2007 | Williams | ............... | E21B 47/01 356/32 |
| 7,461,561 B2 * | 12/2008 | Morrison | ............. | E21B 17/015 73/800 |
| 7,516,673 B2 * | 4/2009 | Dong | ................. | G01L 5/00 73/760 |
| 7,599,249 B2 * | 10/2009 | Welker | ............... | G01V 1/3835 367/19 |
| 7,646,945 B2 * | 1/2010 | Jones | ................ | G01M 11/085 385/13 |
| 7,889,840 B2 * | 2/2011 | Vasudevan | ............... | B64F 5/60 378/58 |
| 7,896,069 B2 * | 3/2011 | Dria | ................... | G01B 11/245 166/250.01 |
| 8,610,882 B2 * | 12/2013 | Roberts | ............... | E21B 17/015 356/32 |
| 8,953,915 B2 * | 2/2015 | Sarchi | ................. | G01K 11/32 385/101 |
| 9,032,809 B2 * | 5/2015 | Kemnitz | ............... | G01L 1/242 73/800 |
| 9,038,478 B2 * | 5/2015 | Hovhanessian | .......... | G01N 3/32 73/812 |
| 9,134,358 B2 * | 9/2015 | Wu | ........................ | G01N 3/08 |
| 9,400,221 B2 * | 7/2016 | Sarchi | ................ | G01M 11/086 |
| 10,274,396 B2 * | 4/2019 | Nott | .................. | G01M 5/0025 |
| 10,451,498 B2 * | 10/2019 | Risch | ................. | G02B 6/4416 |
| 10,495,779 B2 * | 12/2019 | LeBlanc | ................. | G01V 8/16 |
| 10,564,066 B2 * | 2/2020 | Greaves | ............... | G01M 7/022 |
| 10,718,698 B2 * | 7/2020 | Hei-Chouquet | .... | H01L 51/0097 |
| 10,883,894 B2 * | 1/2021 | Rice | ..................... | E21B 17/017 |
| 11,085,758 B2 * | 8/2021 | Jalilian | ................. | G01B 11/18 |
| 2010/0277329 A1 * | 11/2010 | Worzyk | ............... | G01M 11/085 340/679 |
| 2011/0042557 A1 * | 2/2011 | Mossman | ............ | G01M 3/047 250/227.16 |
| 2011/0054840 A1 * | 3/2011 | Hively | ............... | G01M 5/0075 702/182 |
| 2012/0271566 A1 * | 10/2012 | Deshmukh | ............. | G06F 30/23 702/42 |
| 2013/0208259 A1 * | 8/2013 | Graham | ................ | F16L 11/12 356/32 |
| 2015/0136264 A1 * | 5/2015 | Holland | ............... | F16L 11/081 138/104 |
| 2020/0080416 A1 * | 3/2020 | Hebert | ..................... | G01L 5/04 |
| 2020/0123891 A1 * | 4/2020 | Choi | ..................... | G06F 30/23 |
| 2021/0115780 A1 * | 4/2021 | Hyland | ................. | E21B 47/01 |

FOREIGN PATENT DOCUMENTS

| | | |
|---|---|---|
| WO | 2012059736 A2 | 5/2012 |
| WO | 2016092475 A1 | 6/2016 |

OTHER PUBLICATIONS

Extended European Search Report Application No. 17200664.5 Completed: May 8, 2018; dated May 22, 2018 8 Pages.
International Search Report and Written Opinion of the International Searching Authority Application No. PCT/EP2018/080522 Completed: Jan. 29, 2019 dated Feb. 5, 2019 11 Pages.

* cited by examiner

US 11,346,744 B2

METHOD AND SYSTEM FOR FATIGUE-MONITORING OF A SUBMARINE CABLE IN OFF-SHORE OPERATIONS

TECHNICAL FIELD

The present disclosure generally relates to off-shore jointing or reparation of submarine cables.

BACKGROUND

Off-shore jointing of submarine cables can be performed as a planned joint, to connect two sub-lengths or, in case of damage, to repair a cable.

The jointing operation involves several steps where the cable is suspended from the vessel chute in a catenary to the seabed. During this time the cable experiences loads due to wave induced vessel motions in combination with hydrodynamic loads due to wave action. The cable is exposed to repeated bending, and this variation in cable curvature results in cyclic strain variations in the cable components which can result in fatigue damage. The most fatigue-critical component in a high voltage power cable is the lead sheath, while for medium voltage cables the most fatigue-critical component may be the conductor, the armour wires or screen, depending on the cable design. For high voltage cables, excessive fatigue loading of the lead sheath leads to cracks that allow water diffusion to the insulation which eventually can lead to an electrical failure. Corresponding considerations apply for medium voltage cables.

With larger cables and at higher voltage levels the cable becomes more sensitive to fatigue and the jointing time increases and can be up to 8 days long. Fatigue of the lead sheath during the jointing operation is therefore becoming an increasing concern and is something that needs to be considered when planning the jointing operation.

Until recently, no assessment with regards to fatigue was made and the jointing was performed as long as the weather allowed safe working conditions. Today, a fatigue analysis can be performed beforehand to provide recommendations with regards to allowable standstill time as a function of the weather conditions. However, during an off-shore jointing operation the weather will change and it is not always possible to accurately determine the wave height, periods, direction and spectrum. There are also uncertainties in the analysis such as the vessel response and cable properties.

SUMMARY

In view of the above, it is very difficult to know during an off-shore jointing operation what kind of fatigue damage is being accumulated and thus difficult to determine whether there is a risk for excessive fatigue damage.

If the weather deteriorates or the jointing operation takes longer time than planned it is very hard to evaluate if there is a risk for fatigue damage and to decide if the jointing shall be stopped and the cable cut.

It is also difficult to provide evidence that there is no potential future risk for failure due to cracks in the lead sheath.

A general object of the present disclosure is to provide a method which solves or at least mitigates problems of the prior art.

There is hence according to a first aspect of the present disclosure provided a method for fatigue-monitoring of a submarine cable during off-shore jointing or reparation, the method comprising: a) determining a plurality of curvature values concerning a curvature of the submarine cable at different points in time during the off-shore jointing or reparation, b) determining a plurality of strain ranges of the submarine cable based on the plurality of curvature values, and c) determining a fatigue damage of the submarine cable based on the plurality of strain ranges.

Thereby the risk for fatigue failure during jointing can be significantly reduced. The method furthermore provides evidence that the jointing operation has been successful also with regards to fatigue and that there is no risk for future failures due to cracks in the lead sheath and resulting water ingress.

It can also function as a tool to optimize the cable catenary and vessel heading during the jointing operation or reparation to reduce fatigue.

An alternative term for "strain" as used throughout this text is "stress". With "fatigue damage" is meant a mechanical weakening of the submarine cable, which, if sufficiently many strain cycles occur, leads to fatigue failure.

The submarine cable may be a submarine power cable, for example be a medium voltage or a high voltage cable. The submarine cable may be an AC submarine cable or a DC submarine cable.

One embodiment comprises repeating steps a) to c) during the off-shore jointing or reparation, wherein in each iteration of step c) the fatigue damage is determined based on the plurality of strain ranges determined in step b) of the current iteration and on the fatigue damage determined in the previous iteration of step c), thereby obtaining an accumulated fatigue damage.

According to one embodiment step b) comprises determining a number of occurrences of each strain range, wherein in step c) the fatigue damage is determined based on the number of occurrences of each strain range.

Each occurrence of a strain range is a strain cycle. Hereto, it can be said that the fatigue damage in step c) is determined based on the number of strain cycles for each strain range.

One embodiment further comprises determining a number of cycles to failure of a lead sheath or other metallic component of the submarine cable for each strain range, wherein in step c) the fatigue damage is determined further based on the number of cycles to failure for each strain range.

According to one embodiment the number of cycles to failure for each strain range is determined using an S-N fatigue curve for a lead sheath or other metallic component of the submarine cable. For medium voltage cables the S-N Fatigue curve may be for a metallic component such as the conductor, the armour wires or the screen. The S-N fatigue curve is also known as the Wöhler curve.

According to one embodiment step c) involves using the number of occurrences of each strain range and the corresponding number of cycles to failure with the Palmgren-Miner linear damage hypothesis to determine the fatigue damage.

In particular, the number of occurrences of each strain range may be divided with the corresponding number of cycles to failure, and these ratios may be summed. Typically, if this sum at the end of the jointing operation or reparation is equal to or above a predetermined number, typically 1, such stress/strain has been accumulated that the lead sheath, in the case of a high voltage cable, or other metallic component, in the case of a medium voltage cable, has failed.

According to one example, an upper limit can be set well below the predetermined number, so that as long as the sum is below or equal to the upper limit, it can be concluded with a safety margin that the submarine cable has not been critically damaged. This upper limit may for example be in the range 0.05-0.5, such as 0.1-0.5, for example 0.1-0.4 or 0.1-0.3 if the predetermined number is set to 1. The system configured to perform the method may be configured to indicate in real-time or essentially in real-time during the jointing/reparation to vessel crew that the sum from the Palmgren-Miner linear damage hypothesis approaches the upper limit. This allows for the operator to take appropriate action in case the sum approaches the upper limit.

According to one embodiment in step b) the determining of each strain range involves using a mathematical model of the submarine cable.

According to one embodiment in step a) the determining involves obtaining measurements of a curvature of the submarine cable from a curvature monitoring device monitoring the submarine cable in a region where the submarine cable leaves the vessel chute.

There is according to a second aspect of the present disclosure provided a computer program comprising computer code which when executed by processing circuitry of a system causes the system to perform the method of the first aspect.

There is according to a third aspect of the present disclosure provided a system for fatigue-monitoring of a submarine cable during off-shore jointing or reparation, the system comprising: a curvature monitoring device configured to provide a measure of a curvature of the submarine cable during the off-shore jointing or reparation, a storage medium comprising computer code, and processing circuitry which when executing the computer code causes the system to perform the method of the first aspect.

According to one embodiment the curvature monitoring device comprises a sleeve configured to be placed around the submarine cable, which sleeve includes a plurality of strain gauges positioned at regular intervals from each other in the axial direction of the sleeve, and which strain gauges are configured to provide a measure of a curvature of the submarine cable.

According to one embodiment the curvature monitoring device comprises inclination sensors configured to be mounted on the submarine cable, which inclination sensors are configured to provide a measure of a curvature of the submarine cable.

According to one embodiment the curvature monitoring device comprises a deflection measurement system configured to measure a deflection of the submarine cable to provide a measure of a curvature of the submarine cable.

According to one embodiment the system is configured to repeat steps a) to c) while the submarine cable is being suspended from the vessel chute, wherein in each iteration of step c) the system is configured to determine the fatigue damage based on the plurality of strain ranges determined in step b) of the current iteration and on the fatigue damage determined in the previous iteration of step c), thereby obtaining an accumulated fatigue damage.

According to one embodiment wherein in step b) the system is configured to determine a number of occurrences of each strain range, wherein the system is configured to, in step c), determine the fatigue damage based on the number of occurrences of each strain range.

According to one embodiment the system is configured to determine a number of cycles to failure of a lead sheath or other metallic component of the submarine cable for each strain range, wherein the system is configured to, in step c), determine the fatigue damage further based on the number of cycles to failure for each strain range.

According to one embodiment the system is configured to determine the number of cycles to failure for each strain range using an S-N fatigue curve for a lead sheath or other metallic component of the submarine cable.

According to one embodiment the system is configured to, in step c), using the number of occurrences of each strain range and the corresponding number of cycles to failure with the Palmgren-Miner linear damage hypothesis to determine the fatigue damage.

According to one embodiment the system is configured to determine each strain range using a mathematical model of the submarine cable.

Generally, all terms used in the claims are to be interpreted according to their ordinary meaning in the technical field, unless explicitly defined otherwise herein. All references to "a/an/the" element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
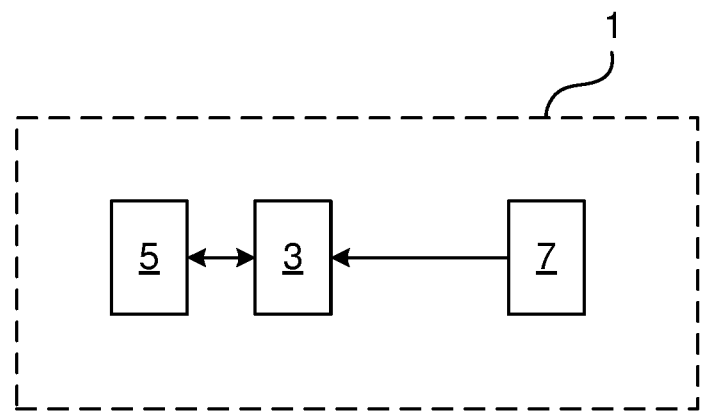
FIG. 1 shows an example of a system for fatigue-monitoring of a submarine cable during off-shore jointing or reparation.

FIG. 1 depicts an example of a system 1 for fatigue-monitoring of a submarine cable during off-shore jointing or reparation.

The system 1 comprises processing circuitry 3, a storage medium 5, and a curvature monitoring device 7. The curvature monitoring device 7 is configured to provide a measure of a curvature of a submarine cable during the off-shore jointing or reparation to the processing circuitry 3.

The storage medium 5 comprises computer code which when executed by the processing circuitry 3 causes the system 1 to perform the method disclosed herein.

The processing circuitry 3 uses any combination of one or more of a suitable central processing unit (CPU), multiprocessor, microcontroller, programmable logic controller (PLC), digital signal processor (DSP), application specific integrated circuit (ASIC), field programmable gate arrays (FPGA) etc., capable of executing any herein disclosed operations concerning fatigue-monitoring of a submarine cable during off-shore jointing or reparation.

The storage medium 5 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory.

Figure 2:
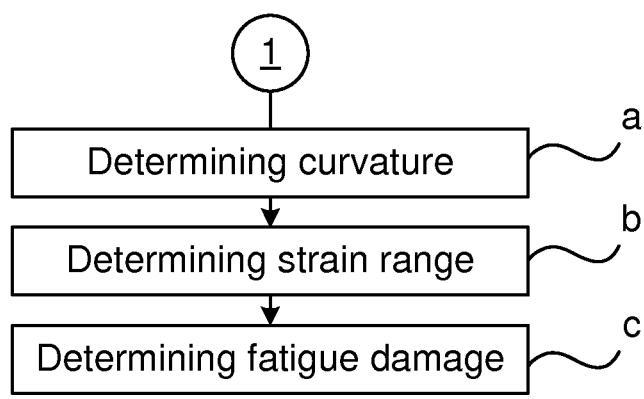
FIG. 2 shows a flowchart of a method for fatigue-monitoring of a submarine cable.
Figure 3:
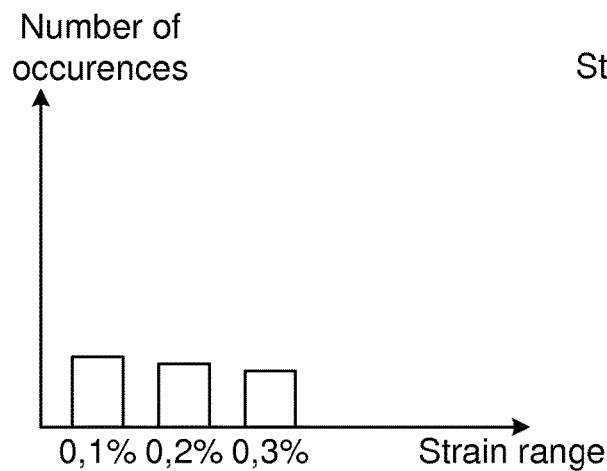
FIG. 3 shows an example of a histogram containing the number of occurrences of strain ranges.
Figure 4:
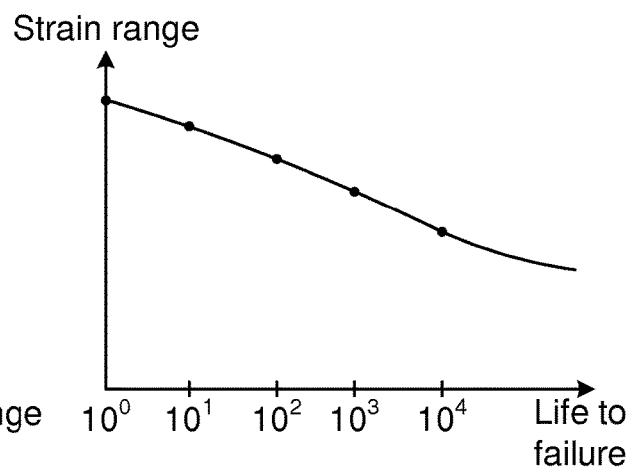
FIG. 4 is an example of an S-N fatigue curve.

A method for fatigue-monitoring of a submarine cable during off-shore jointing or reparation performed by the system 1 will now be described with reference to FIGS. 2-4.

In the following example, the submarine cable subjected to the off-shore jointing or repair operation comprises at least one core and a lead sheath surrounding the at least one core. The lead sheath acts as a water barrier, preventing water from penetrating into the at least one core. It should be noted that this method could also be used for medium voltage cables without a lead sheath, in which case another metallic component, namely the conductor, the armour wire, or the screen is monitored for fatigue damage.

When preparing for a jointing or repair operation off-shore, the vessel crew may arrange the curvature monitoring device 7 so that the curvature of the submarine cable may be measured. Examples of the curvature monitoring device 7 will be provided later.

The most fatigue-sensitive region is in the region where the submarine cable leaves the vessel chute. Heave motion of the vessel chute results in that the submarine cable is bent and straightened against the vessel chute. Hereto, the curvature monitoring device 7 is preferably arranged so as to be able to monitor the curvature of the submarine cable in the region where it leaves the vessel chute.

The curvature monitoring device 7 may obtain curvature measurements which provide a measure of the curvature of the submarine cable. For each iteration of the method a plurality of curvature measurements can for example be obtained over a number of minutes, such as at least 5 minutes, for example at least 10 minutes or at least 20 minutes. The measurements are hence obtained at different points in time, reflecting the dynamic movement of the submarine cable over the measurement period.

In a step a) of the method a plurality of curvature values concerning the curvature of the submarine cable is determined. The curvature values reflect the curvature of the submarine cable at different points in time during off-shore jointing or repair. The curvature values may be seen as an irregular time-series of curvature values.

The processing circuitry 3 may be configured to determine the plurality of curvature values based on the curvature measurement made by the curvature monitoring device 7.

In one example a plurality of curvature ranges may be determined in step a) from the plurality of curvature values. For this purpose, the rain-flow counting method may for example be used on the curvature values.

In a step b) a plurality of strain ranges of the submarine cable are determined based on the plurality of curvature values. In particular, the plurality of strain ranges may relate to the strain in the lead sheath of the submarine cable for different strain cycles. Alternatively, the strain ranges may relate to the strain in another metallic component of the type noted above, in case the submarine cable is a medium voltage submarine cable.

In an example where step a) involves determining a plurality of curvature ranges, the plurality of strain ranges are determined based on the curvature ranges.

Each strain range may be obtained using a mathematical model of the submarine cable. The curvature ranges are thus input values into the mathematical model, resulting in corresponding strain ranges as output.

In another example, where no curvature ranges are determined, the curvature values may be used to determine the plurality of strain values. Each strain value may be obtained using a mathematical model of the submarine cable. The curvature values are thus input values into the mathematical model, resulting in corresponding strain values as output. The strain ranges may in this case be determined based on the strain values, using for example the rain-flow counting method on the strain values.

In case the submarine cable is a DC submarine cable, the curvature values or curvature ranges are sufficient as input to the mathematical model to obtain the strain values or the strain ranges. In the case the submarine cable is an AC submarine cable, the tension of the AC submarine cable at each measurement instance may also be required as input together with the curvature values or curvature ranges to obtain the corresponding strain values or strain ranges.

Additionally, in step b) the number of occurrences of each strain range stemming from the curvature measurement may be determined. This can for example be obtained by using the rain flow counting method on the strain ranges. An example of a histogram showing the distribution of different strain ranges and their number of occurrences is shown in FIG. 3.

Next, the number of cycles to failure of the lead sheath or other metallic component for each strain range is determined. The number of cycles to failure for the strain ranges can for example be determined using an S-N fatigue curve for the lead sheath/submarine cable in the case of a high voltage cable or for the other metallic component/submarine cable in the case of a medium voltage cable. An example of an S-N fatigue curve is shown in FIG. 4. In the example, the strain ranges are on the y-axis, for example provided in percentage, and the number of cycles to failure is on the x-axis.

In a step c) a fatigue damage of the submarine cable is determined based on the plurality of strain values.

In step c) the fatigue damage of the submarine cable may be obtained using the number of occurrences of each strain range and the number of cycles to failure for each of the strain ranges. In particular, the Palmgren-Miner linear damage hypothesis can be used to determine the fatigue damage. The Palmgren-miner linear damage hypothesis, also referred to as Miners rule, states that failure occurs when $$\sum_{i=1}^{k} \frac{n_i}{N_i} = C$$

where k is the number of different strain ranges, $n_i$ is the contribution of the ith strain range, i.e. the number of occurrences of a strain range of a particular magnitude, and $N_i$ is the number of cycles to failure for the ith strain range as determined using the S-N fatigue curve. C is a predetermined number, a constant, at which failure occurs. The constant C may for example be set to 1. For each iteration of steps a) to c) the fatigue damage of the current iteration is added to the fatigue damage of the previous iteration. The accumulated fatigue damage is thus obtained. In this manner, an essentially real-time monitoring of the fatigue damage of the lead sheath or other metallic component may be provided.

Steps a) to c) are repeated as long as the jointing or reparation operation is ongoing, or fatigue failure is being indicated. As noted above, in every iteration, the fatigue damage becomes an accumulated fatigue damage which is determined based on the plurality of strain ranges determined in the current iteration and based on the fatigue damage of the previous iteration.

Real-time fatigue-monitoring of the submarine cable can thus be obtained.

Figure 5:
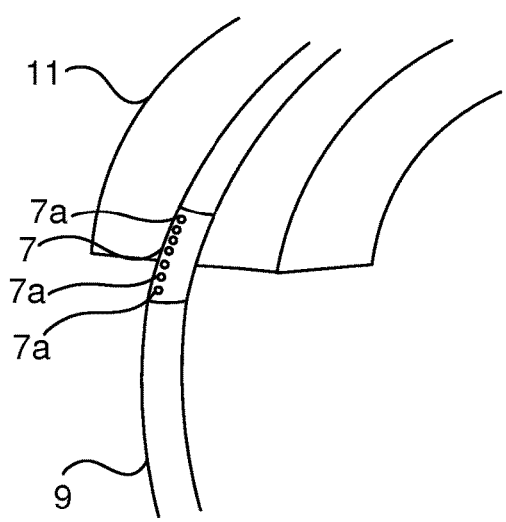
FIG. 5 schematically shows a vessel chute including a submarine cable leaving the vessel chute.

Different examples of the curvature monitoring device 7 will now be described with reference to FIG. 5. In FIG. 5 a perspective view of a submarine cable 9 is shown leaving a vessel chute 11. In the example, the curvature monitoring device 7 comprises a plurality of devices 7a configured to provide a measure of the curvature of the submarine cable 9. The devices 7a may for example be strain gauges or inclination sensors. Alternatively, the curvature monitoring device 7 may comprise a deflection measurement system configured to measure a deflection of the submarine cable to thereby provide a measure of a curvature of the submarine cable 9.

In case the devices 7a are strain gauges these may be positioned at 12 o'clock, i.e. at the top of the submarine cable 9. The curvature monitoring device 7 may in this case comprise a sleeve configured to be arranged around the submarine cable 9. The sleeve may for example be made of a plastic material such as polyethylene or polyurethane. In FIG. 5 the sleeve is arranged around the submarine cable 9 in a region where it leaves the vessel chute 11. The sleeve may extend for several meters and may contain the devices 7a. The devices 7a may be provided at regular intervals from each other in the axial direction of the sleeve. Using the strain gauges, based on a time series of strain, ε(t), the cable curvature κ at each location is given by $$\kappa(t) = \frac{\varepsilon(t)}{r}$$

where r is the radius of the outer sheath of the submarine cable 9. The radius r is hence the radial distance from the center of the submarine cable 9 to the location of the strain gauge.

In case the devices 7a are inclination sensors, the inclination sensors are configured to be mounted on the submarine cable 9 at regular intervals. The average curvature between two inclination sensors is given by $$\kappa_i = \frac{\Delta\theta_i}{\Delta L_i}$$

where Δθi is the difference in angle between the ith and the ith+1 inclination sensor, measured in radians, and ΔLi is the distance between the two inclination sensors. The inclination sensors could for example be mounted on a flexible frame equally spaced apart, to allow quick mounting of several inclination sensors onto the submarine cable 9.

If the curvature monitoring system 7 comprises a deflection measurement system, the deflection of the submarine cable 9 may be measured in relation to a fixed frame or reference of the vessel. The deflection can continuously be measured along the section of the submarine cable 9 on the vessel chute 11. The deflection can be determined optically or using distance sensors. Hereto, the deflection measurement system may comprise a video camera and there may be provided optical markers on the submarine cable 9. Alternatively, the deflection measurement system may comprise distance sensors. In either case, a polynomial curve y=f(s) can be fitted to the measured deflection as a function of the distance s along the submarine cable 9. The curvature κ IS given by $$\kappa = \frac{y''}{(1 + y'^2)^{3/2}}$$

where y' and y" are the derivatives of y with respect to s.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A method for fatigue-monitoring of a submarine power cable during off-shore jointing or reparation, the method comprising:
   a) determining a plurality of curvature values concerning a curvature of the submarine power cable at different points in time during the off-shore jointing or reparation,
   b) determining a plurality of strain ranges of the submarine power cable based on the plurality of curvature values,
   wherein in step b) the determining of each strain range involves using a mathematical model of the submarine power cable, and
   c) determining a fatigue damage of the submarine power cable during the off-shore jointing or reparation based on the plurality of strain ranges,
   wherein step b) comprises determining a number of occurrences of each strain range, wherein in step c) the fatigue damage is determined based on the number of occurrences of each strain range, and
   wherein in step a) the determining involves obtaining measurements of the curvature of the submarine power cable from a curvature monitoring device monitoring the submarine power cable in a region where the submarine power cable leaves a vessel chute.

2. The method as claimed in claim 1, comprising repeating steps a) to c) during the off-shore jointing or reparation, wherein in each iteration of step c) the fatigue damage is determined based on the plurality of strain ranges determined in step b) of the current iteration and on the fatigue damage determined in the previous iteration of step c) thereby obtaining an accumulated fatigue damage.

3. The method as claimed in claim 2, further comprising determining a number of cycles to failure of a lead sheath or other metallic component of the submarine power cable for each strain range, wherein in step c) the fatigue damage is determined further based on the number of cycles to failure for each strain range.

4. The method as claimed in claim 1, further comprising determining a number of cycles to failure of a lead sheath or other metallic component of the submarine power cable for each strain range, wherein in step c) the fatigue damage is determined further based on the number of cycles to failure for each strain range.

5. The method as claimed in claim 4, wherein the number of cycles to failure for each strain range is determined using an S-N fatigue curve for the lead sheath or the other metallic component of the submarine power cable.

6. The method as claimed in claim 5, wherein step c) involves using the number of occurrences of each strain range and the corresponding number of cycles to failure with the Palmgren-Miner linear damage hypothesis to determine the fatigue damage.

7. The method as claimed in claim 4, wherein step c) involves using the number of occurrences of each strain range and the corresponding number of cycles to failure with the Palmgren-Miner linear damage hypothesis to determine the fatigue damage.

8. A computer program comprising computer code which when executed by processing circuitry of a system causes the system to perform a method for fatigue-monitoring of a submarine power cable during off-shore jointing or reparation, the method includes:
  a) determining a plurality of curvature values concerning a curvature of the submarine power cable at different points in time during the off-shore jointing or reparation,
  b) determining a plurality of strain ranges of the submarine power cable based on the plurality of curvature values,
  wherein in step b) the determining of each strain range involves using a mathematical model of the submarine power cable, and
  c) determining a fatigue damage of the submarine power cable during the off-shore jointing or reparation based on the plurality of strain ranges,
  wherein step b) comprises determining a number of occurrences of each strain range, wherein in step c) the fatigue damage is determined based on the number of occurrences of each strain range, and
  wherein in step a) the determining involves obtaining measurements of the curvature of the submarine power cable from a curvature monitoring device monitoring the submarine power cable in a region where the submarine power cable leaves a vessel chute.

9. The computer program as claimed in claim 8, wherein the method includes repeating steps a) to c) during the off-shore jointing or reparation, wherein in each iteration of step c) the fatigue damage is determined based on the plurality of strain ranges determined in step b) of the current iteration and on the fatigue damage determined in the previous iteration of step c) thereby obtaining an accumulated fatigue damage.

10. A system for fatigue-monitoring of a submarine power cable during off-shore jointing or reparation, the system comprising:
  a curvature monitoring device configured to provide a measure of a curvature of the submarine power cable,
  a storage medium comprising computer code, and
  processing circuitry which when executing the computer code causes the system to perform steps of:
    a) determining a plurality of curvature values concerning the curvature of the submarine power cable at different points in time during the off-shore jointing or reparation,
    b) determining a plurality of strain ranges of the submarine power cable based on the plurality of curvature values,
    wherein in step b) the determining of each strain range involves using a mathematical model of the submarine power cable, and
    c) determining a fatigue damage of the submarine power cable during the off-shore jointing or reparation based on the plurality of strain ranges,
    wherein step b) comprises determining a number of occurrences of each strain range, wherein in step c) the fatigue damage is determined based on the number of occurrences of each strain range,
    wherein in step a) the determining involves obtaining measurements of the curvature of the submarine power cable from the curvature monitoring device monitoring the submarine power cable in a region where the submarine power cable leaves a vessel chute, and
  wherein the curvature monitoring device comprises at least one of:
    a sleeve placed around the submarine power cable in the region where the submarine power cable leaves the vessel chute, said sleeve includes a plurality of strain gauges positioned at regular intervals from each other in an axial direction of the sleeve, and said strain gauges are configured to provide the measure of the curvature of the submarine power cable;
    inclination sensors mounted on the submarine power cable in the region where the submarine power cable leaves a vessel chute, said inclination sensors are configured to provide the measure of the curvature of the submarine power cable; or
    a cable deflection measurement system configured to continuously measure a deflection of the submarine power cable along a section of the submarine power cable on the vessel chute to provide the measure of the curvature of the submarine power cable.

11. The system as claimed in claim 10, wherein the processing circuitry causes the system to repeat steps a) to c) during the off-shore jointing or reparation, wherein in each iteration of step c) the fatigue damage is determined based on the plurality of strain ranges determined in step b) of the current iteration and on the fatigue damage determined in the previous iteration of step c) thereby obtaining an accumulated fatigue damage.

12. The system as claimed in claim 10, wherein the processing circuitry causes the system to determine a number of cycles to failure of a lead sheath or other metallic component of the submarine power cable for each strain range, wherein in step c) the fatigue damage is determined further based on the number of cycles to failure for each strain range.

13. The system as claimed in claim 12, wherein the number of cycles to failure for each strain range is determined using an S-N fatigue curve for the lead sheath or the other metallic component of the submarine power cable.

* * * * *